(12) United States Patent
List et al.

(10) Patent No.: US 6,453,170 B1
(45) Date of Patent: Sep. 17, 2002

(54) MOBILE STATION USER INTERFACE, AND AN ASSOCIATED METHOD, FACILITATING USAGE BY A PHYSICALLY-DISABLED USER

(75) Inventors: Steve List, Camberley (GB); Harri Kiljander, Irving, TX (US); Robert Houston, Basingstoke (GB); Nancy Longbottom, Forth Worth, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/223,907

(22) Filed: Dec. 31, 1998

(51) Int. Cl.[7] ................................................ H04Q 7/32
(52) U.S. Cl. .................... 455/550; 455/575; 455/90; 379/456; 379/368; 379/369; 379/447; 379/450; 340/825.19
(58) Field of Search ................................ 379/456, 428, 379/433, 422, 368, 369, 447, 450, 5.2, 56.1; 455/351, 567, 550, 564, 575, 90, 31.2, 31.3, 344; 704/271; 341/21, 22; 340/825.19

(56) References Cited

U.S. PATENT DOCUMENTS

| | | | | |
|---|---|---|---|---|
| 3,795,281 A | * | 3/1974 | Cloran | 340/825.19 |
| 3,927,282 A | * | 12/1975 | Firstenberg | 379/368 |
| 4,905,007 A | * | 2/1990 | Rohm | 340/825.19 |
| 5,140,632 A | * | 8/1992 | Anten | 379/368 |
| 5,201,594 A | * | 4/1993 | Adinolfi et al. | 340/825.19 |
| 5,298,883 A | * | 3/1994 | Pilney et al. | 455/31.2 |
| 5,422,640 A | * | 6/1995 | Haley | 340/825.19 |
| 5,534,851 A | * | 7/1996 | Russek | 455/351 |
| 5,559,859 A | * | 9/1996 | Dai et al. | 455/31.3 |
| 5,982,853 A | * | 11/1999 | Lieberman | 455/52 |

FOREIGN PATENT DOCUMENTS

GB     2264196    * 8/1993

* cited by examiner

*Primary Examiner*—William Trost
*Assistant Examiner*—Keith Ferguson
(74) *Attorney, Agent, or Firm*—Robert H. Kelly; Stephen J. Wyse; Steven A. Shaw

(57) ABSTRACT

A user interface, and an associated method, facilitates operation of a mobile station by a physically-disabled user. In one implementation, concave-shaped face covers are provided for the telephonic keypad of a mobile station to facilitate its usage by a physically-disabled user. In another implementation, the mobile station is provided with a TTY (telecommunications device), also to facilitate operation of the mobile station by a physically-disabled user. And, in another implementation, a location-request signal generator, carriable by a user, generated a location-request signal upon actuation by the user. The mobile station includes a local receiver for receiving the location-request signal and an annunciator for annunciating reception of the location-request signal. If the mobile station becomes misplaced, a user actuates the location-request signal generator, and the annunciation signal generated responsive to detection of such signal at the mobile station facilitates location of the mobile station.

16 Claims, 4 Drawing Sheets

MOBILE STATION USER INTERFACE, AND AN ASSOCIATED METHOD, FACILITATING USAGE BY A PHYSICALLY-DISABLED USER

The present invention relates generally to a user interface for a mobile station operable in a radio communication system, such as a cellular communication system. More particularly, the present invention relates to a user interface, and an associated method, for facilitating its usage by a physically-disabled user. Through operation of an embodiment of the present invention, a physically-disabled person is better able to make use of the mobile station to communicate therethrough.

BACKGROUND OF THE INVENTION

The use of multi-user, radio communication systems has achieved wide popularity in recent years as advancements in communication technologies have permitted the implementation of such radio communication systems to be affordably utilized by large numbers of users.

In a radio communication system, a communication channel connecting a sending and a receiving station is formed of a radio communication channel, defined upon a portion of the electromagnetic spectrum. Because a radio communication channel is used to communicate communication signals between the sending and receiving stations, a wire line connection is not required to effectuate the transmission of the communication signal between the sending and receiving stations. Communication by way of a radio communication system, therefore, is of particular advantage when formation of a wire line connection between sending and receiving stations to effectuate communications therebetween would be impractical.

A sending station of a radio communication system is operable to convert information which is to be communicated to the receiving station into a communication signal of characteristics which permits its communication upon the radio communication channel. To convert the information into such a communication signal, the sending station modulates the information signal upon a carrier wave of a carrier frequency within the range of frequencies which defines, at least in part, the communication channel.

A cellular communication system is exemplary of a radio communication system, usage of which has achieved wide popularity in recent years. While a user communicates by way of a radio transceiver, referred to as a mobile station, the mobile station is constructed to mimic the operation of a conventional, wire line, telephonic device. Because telephonic communication can be effectuated without the need for the formation of a wire line connection with the mobile station, the mobile station can be utilized to effectuate telephonic communications from locations at which formation of a wire line connection would be inconvenient or impractical.

Because a mobile station is typically a portable device, the mobile station can be carried by a user. Telephonic communications can be effectuated therethrough from almost any location encompassed by a cellular communication system. Thereby, a mobile station provides a mechanism for the furtherance of the user's personal security. That is to say, a user of the mobile station is able to make use of the mobile station to request emergency assistance, or other emergency service, immediately through the use of the mobile station, when necessary, from almost any location.

However, conventional mobile stations are generally constructed to be used by a user of good physical ability. That is to say, generally, the user must at least be capable of actuating the keys of a telephonic keypad of the mobile stations. Actuation of the keys of the keypad permit calls to be originated at the mobile station. And, as mobile stations become increasingly portablized, housed in packages of increasingly smaller dimensions, the telephonic keypads of such mobile stations are sometimes correspondingly reduced in dimension, thereby increasing the difficulty of usage of the mobile station by a user suffering from a physical disability.

For instance, the actuation keys of the telephonic keypad have top face surfaces which are generally convex-shaped. While aesthetically distinctive, and easily actuable by a user of good physical ability, a user suffering from a physical disability might be unable easily to actuate the keys of such a telephonic keypad.

Actuation keys of other consumer electronic devices, such as personal computers, are sometimes more easily actuable by a user suffering from a physical disability. A keyboard of a personal computer, for instance, typically includes keys which are of concave-shaped face surfaces. Such keys are more easily actuable by a user to actuate the keys with a mouth pin. The telephonic keys of a conventional mobile station having convex-shaped face surfaces cannot similarly be actuated easily.

A user suffering from loss of aural acuity analogously is sometimes unable to make use of a mobile station. The user interface of a conventional mobile station is typically constructed in a manner permitting only one of good physical, here aural, ability to utilize the mobile station. While TTY. (Text Telephone devices) are available for conventional, wire line, telephonic devices, TTY devices have not generally been used together with mobile stations in a manner convenient to a user thereof.

Users suffering from diminished visual acuity also sometimes have problems utilizing mobile stations. Because of the portable nature of a mobile station, the mobile station is typically not maintained at a permanent location. A user suffering from diminished visual acuity might have difficulty in locating the mobile station. Users suffering from dementia or an Alzheimer-related affliction, might similarly have difficulty in locating a portable mobile station.

Improvements made to the user interface of the mobile station would facilitate its use by a user suffering from a disability.

It is in light of this background information related to user interfaces for mobile stations that the significant improvement of the present invention have evolved.

SUMMARY OF THE INVENTION

The present invention, accordingly, advantageously provides a user interface, and an associated method, for a mobile station to facilitate usage of the mobile station by a physically-disabled user. Operation of an embodiment of the present invention facilitates a physically-disabled person's use of the mobile station to communicate therethrough.

In one aspect of the present invention, a telephonic keypad is provided of a construction which facilitates its actuation by a user utilizing a mouth pin. A telephonic keypad is provided which includes telephonic keys which are axially displaceable between an unactuated position and an actuated position. Concave-shaped face covers are positioned, or otherwise formed, upon the actuation keys of the actuation keypad to be seated thereon. The concave-shaped face covers each form a force receiving surface for receiving an actuation force, such as applied by the user utilizing a mouth pin. Responsive to such an actuation force, the actuation key upon which the face cover is seated is axially displaceable into and out of the actuated position.

The face covers, in one implementation, form a key mat which can be installed upon an existing keypad. In other implementations, the face covers are integrally formed with the actuation keys. Thereby, a user is able better to operate the mobile station even if the user is substantially physically incapacitated.

In another aspect of the present invention, a TTY (Text Telephone device) is positioned together with the mobile station and coupled thereto, thereby to permit text messages to be generated at the mobile station and to permit text messages transmitted thereto to be displayed in text form. A user suffering from an aural disability is thereby able better to make use of the mobile station. Such an implementation is analogously also beneficial to any user designed to send or to receive text messages.

In one implementation, the mobile station and the TTY device are housed together in a common housing, thereby to facilitate ease of carriage of the combined device. Also, when housed within a common housing, the connection between the TTY device and the mobile station is made secure and permanent.

In another aspect of the present invention, the mobile station is further provided with a local receiver circuit capable of receiving a locally-generated location-request signal. The location-request signal is generated by a location-request signal generator which is of a size permitting a user to carry a generator, such as by clipping the generator to the user. If the mobile station is misplaced, the user actuates the location-request signal generator to cause generation of the location-request signal. Responsive thereto, the receiver, positioned together with the mobile station, receives the location-request signal. An indication of the reception is provided to an anunciator which anunciates the reception. The anunciator anunciates the reception in a manner which is detectable by the user, such as by the generation of an aural anunciation, a visual anunciation, or a physical anunciation.

Implementation of an embodiment, or various combinations of embodiments, of the present invention facilitate usage of a mobile station by a user suffering from a disability. Through such an implementation, the advantages provided by a cellular, or other radio, communication system are thereby more accessible to a user suffering from the disability.

In these and other aspects, therefore, a user interface, and an associated method, is provided for a mobile station operable in a radio communication system. The user interface facilitates usage thereof by a physically-disabled user. The user interface includes an actuation keypad formed of an array of actuation keys. Each of the actuation keys of the actuation keypad is axially displaceable between an unactuated position and an actuated position. A plurality of concave-shaped face covers is also provided. The concave-shaped face covers correspond in number with the actuation keys of which the actuation keypad is formed. Each of the concave-shaped face covers is seated upon an actuation key of the actuation keypad. Each of the face covers forms a force receiving surface for receiving an actuation force causing axial displacement of the actuation key upon which the face cover is seated out of the unactuated position and into the actuated position.

A more complete appreciation of the present invention and the scope thereof can be obtained from the accompanying drawing which are briefly summarized below, the following detailed description of the presently-preferred embodiment of the invention, and the appended claims.

DETAILED DESCRIPTION

Figure 1:
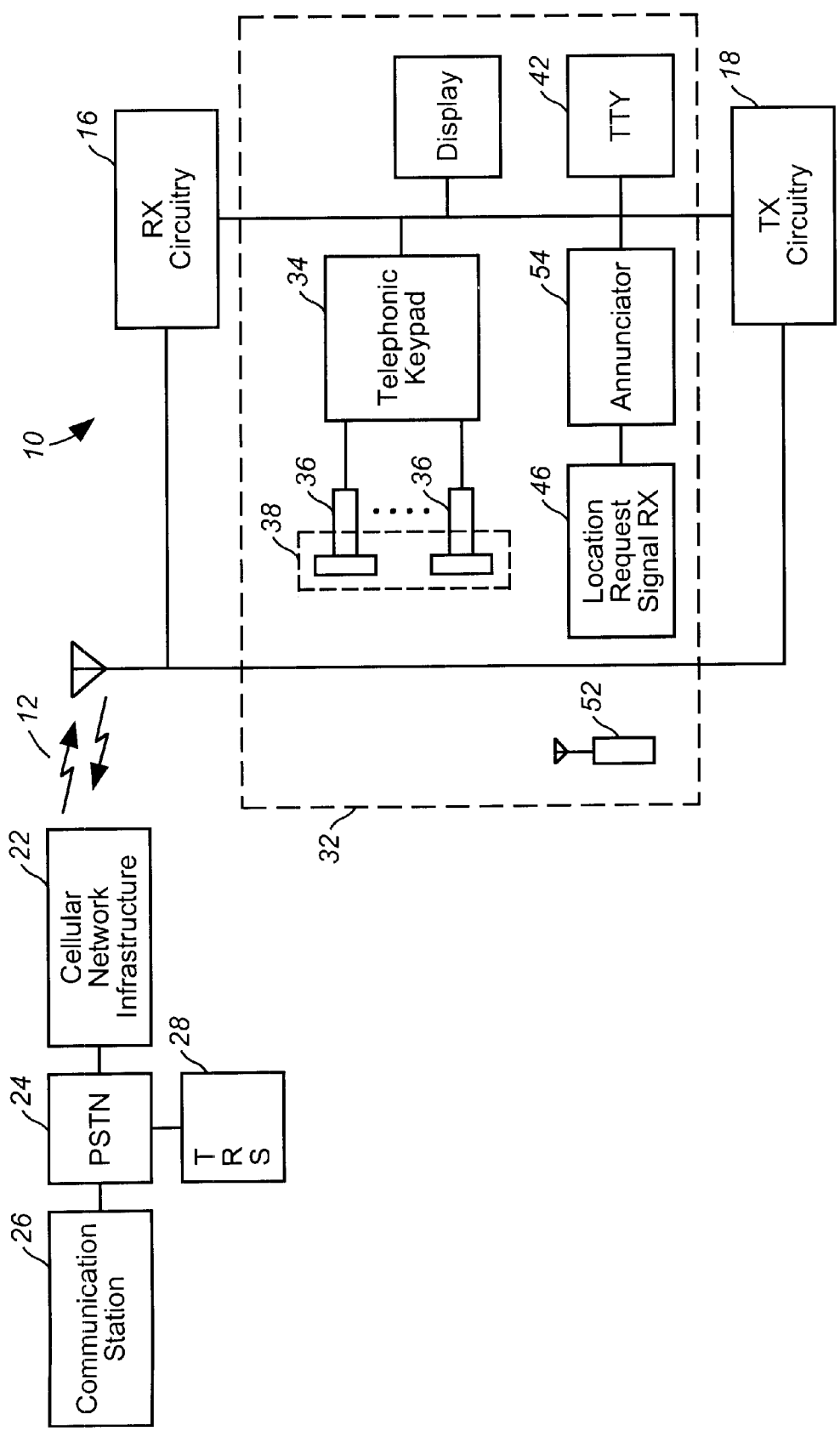
FIG. 1 illustrates a functional block diagram of a mobile station of which a user interface of an embodiment of the present invention forms a portion.

Referring first to FIG. 1, a mobile station, shown generally at 10, is operable to transceive communication signals, thereby to effectuate two-way communication. In the exemplary implementation, the mobile station 10 is operable in a cellular communication system. In other implementations, the mobile station is analogously operable in other types of radio communication systems. Here, the mobile station is operable to receive forward-link signals 12 and to generate reverse-link signals.

The mobile station 10 includes receiver circuitry 16 which is operable to perform, amongst other things, down-conversion and demodulation of forward-link signals received at the mobile station. In a digital, cellular communication system, the receiver circuitry 16 also typically performs decoding operations. The mobile station further includes transmitter circuitry 18 which is operable to generate the forward-link signals transmitted by the mobile station. In conventional manner, the transmitter circuitry performs, amongst other things, modulation and up-conversion operations upon information to be transmitted by the mobile station. When the mobile station is operable in a digital cellular communication system, the transmitter circuitry 18 is typically further operable to perform encoding operations.

The reverse-link signals 14 are transmitted to network infrastructure, here cellular network infrastructure 22 of a cellular communication system. In conventional manner, the network infrastructure 22 is coupled to a PSTN (public-switched, telephonic network) 24. The PSTN is, in turn, coupled to communication stations, such as the communication station 26. Two-way communication is permitted between the mobile station 10 and, for instance, the communication station 26. The PSTN 24 is further coupled to other apparatus such as the TRS (telecommunications relay service) station 28.

The mobile station also includes a user interface 32, here including the elements enclosed by the box, shown in dash, in the figure. The user interface 32 is operable to facilitate use of the mobile station by a user of the mobile station by providing a manner by which to permit the user to input command and control information and to receive operational output generated during operation of the mobile station.

The user interface 32 includes a telephonic keypad 34, here including a plurality of actuation keys 36 arranged in rows and columns together to form an array of actuation keys. The actuation keys 36 typically include a three-by-four array including actuation keys associated with the digits 0–9 and the "pound" and "star" key. The actuation keys 36 are axially displaceable between unactuated positions and actuated positions responsive to application of actuation forces to the actuation keys. The actuation forces are typically applied to top face surfaces of the actuation keys which conventionally are of concave-shaped face surfaces. While such configuration of the face surfaces of the actuation keys provides an aesthetically distinctive appearance, such configuration make more difficult the actuation of such keys by a user utilizing a mouth pin, or the like, to actuate the actuation keys.

An embodiment of the present invention includes concave-shaped face covers 38 associated with each of the actuation keys 36. The face covers 38 are positioned to be seated upon the actuation keys 36 and to provide force-receiving surfaces upon which actuation forces can instead be applied to cause actuation of the actuation keys associated therewith. Because of the concave-shaped configuration of the face covers, actuation of the actuation keys by a physically-disabled user, such as by the user's use of a mouth pin, is facilitated. Also, in the exemplary implementation, the dimensions of the face surfaces of the face covers are increased relative to the surface areas of the face surfaces of the associated actuation keys 36. Such increased surface area further facilitates actuation of the actuation keys by a physically-disabled user.

The face covers can be installed upon the actuation keys of an already-existing mobile station by forming the face covers as part of a mat to be placed over top the actuation keys 36 and positioned such that the face covers seat upon respective ones of the actuation keys. The face covers alternately can be individually formed and individual ones of the face covers are affixed to corresponding ones of the actuation keys. And, the face covers can be integrally formed with the actuation keys during their construction.

The user interface 32 here further includes a TTY (Text Telephone device) 42. The TTY 42 is here shown to be coupled to both the receiver circuitry 16 to the transmitter circuitry 18 of the mobile station. The TTY includes a text keypad (not separately shown) and a text display device (also not separately shown) to permit the generation and reception of text data. The TTY is housed at the same housing which is used to house the receiver and transmitter circuitry of the mobile station, thereby to form a single unit. When formed in this manner, connections between the TTY 42 and the circuitry of the mobile station are formed within the housing of the mobile station, thereby to facilitate formation of a secure, and fixed, connection therebetween. Operation of the TTY facilitates communication by way of the TTY by a user suffering from an aural disability.

Through operation of the TTY 42, the mobile station 10 is able to communicate text directly with a corresponding device located at, or formed of, the communication station 26. If the communication station 26 is not text-capable, text generated by the TTY 42 of the user interface is instead communicated to the TRS 28, and non-text information generated at the communication station 26 is provided to the TRS 28 to be converted into text thereat. Thereby, a user of the mobile station 10 is able to communicate text to and from the communication station 26.

The user interface 32 further includes a local receiver 46, such as an infrared receiver. The local receiver 46 is operable to detect reception of a location-request signal 48 generated by a location-request generator 52, positionable remote from the mobile station. The local receiver 46 is coupled to an anunciator 54 which also forms a portion of the user interface.

Responsive to detection of reception of the location-request signal 48, the local receiver 46 generates signals to cause the anunciator 54 to generate an enunciation signal. In one implementation, the enunciation signal is an aural alarm; in another implementation the anunciation signal is a visual signal; and in yet another implementation, the anunciation signal is a mechanical signal, such as a vibrating alert.

Operation of an embodiment of the present invention facilitates the location of a misplaced mobile station 10 by a user. In an exemplary implementation, the location-request signal generator 52 is of dimensions permitting clipping, or other fastening, of the generator 52 to the body of the user. If the mobile station becomes misplaced, the user actuates the location-request signal generator 52 to cause the generation of the location-request signal 48. Upon detection of reception of the signal by the local receiver 46, the anunciator 54 is caused to generate the anunciation signal, thereby to facilitate location of the misplaced mobile station. The signal 48 is, for instance, an infrared signal, or other radio frequency signal in which the generator 52 and the receiver 46 are matched to permit detection by the receiver 46.

Figure 2:
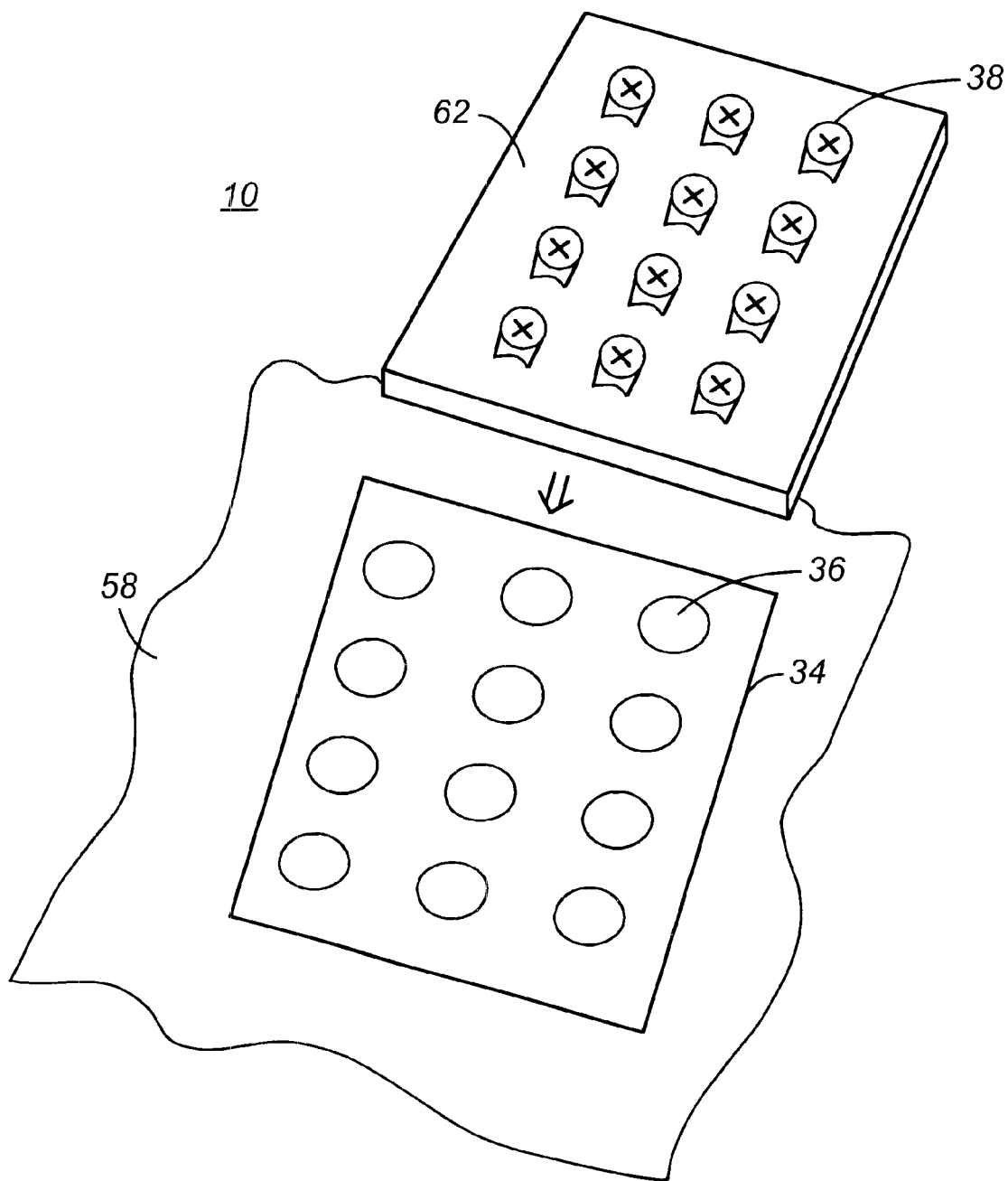
FIG. 2 illustrates a partial, functional block diagram, partial cut-away perspective view, in exploded form, of the user interface of an embodiment of the present invention.

FIG. 2 illustrates a portion of the user interface 32 of an embodiment of the present invention. Here, the telephonic keypad 34 and the face covers 38 of an embodiment of the present invention are shown. The telephonic keypad 34 here illustrates a conventional arrangement of actuation keys 36 positioned to form an array of actuation keys. Actuation keys 36 are associated with each of the numerals 0–9, a "star" symbol, and a "pound" symbol, arranged in conventional manner of a conventional telephonic keypad. The telephonic keypad 34 is supported at a housing 58 face surface of the mobile station.

The face covers 38 are here supported by a mat 62 wherein the face covers 38 are arranged in a manner corresponding to the arrangement of the actuation keys 38 of the telephonic keypad. The entire mat 62 is positioned to be overlaid upon the telephonic keypad. Once positioned to overlay the keypad, the face covers 38 are positioned to be seated upon corresponding actuation keys of the telephonic keypad. Because the face covers 38 are concave-shaped and are of larger face-surface areas than the corresponding actuation keys, actuation of the actuation keys by a user utilizing a mouth pin is facilitated.

Figure 3:
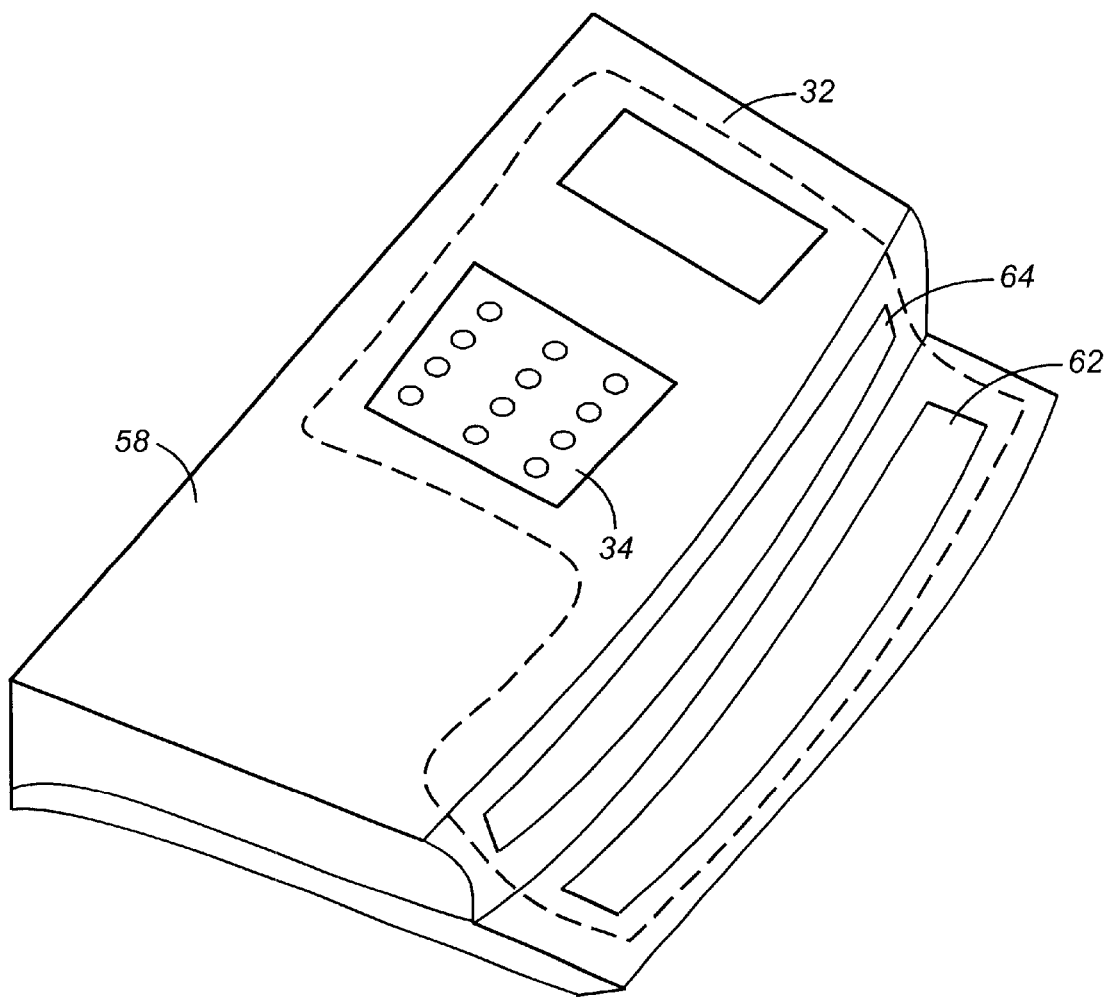
FIG. 3 illustrates a partial, functional block, partial perspective view, of the user interface of another embodiment of the present invention.
Figure 4:
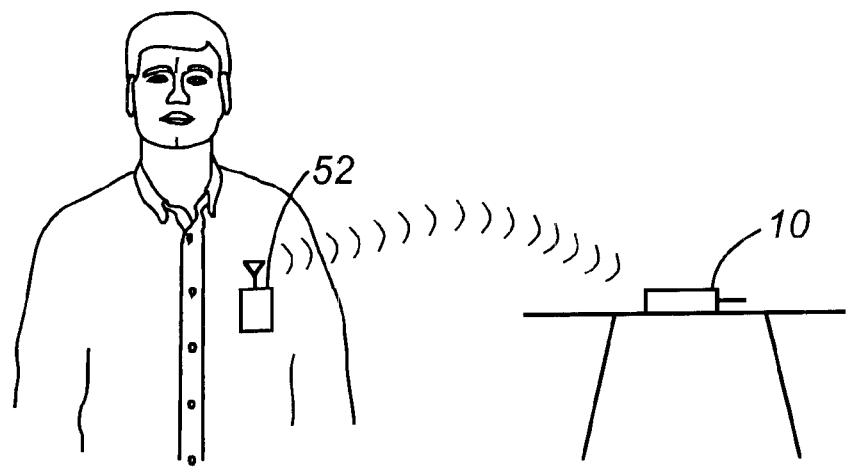
FIG. 4 illustrates a representation of operation of the user interface of another embodiment of the present invention.

FIG. 3 illustrates another feature of the user interface 32 of another embodiment of the present invention. Here, again, the telephonic keypad 34 having a plurality of actuation keys 36 is supported at a face surface of the housing 58 of the mobile station 10. Here, a keyboard 62 and a text display 64, forming portions of the TTY 42 are also shown to form portions of the user interface of the mobile station. When the TTY forms a portion of the user interface, usage of the mobile station by a user of diminished aural abilities is facilitated. Text is entered by the user by way of actuation of the actuation keys of the keypad 62, and text received by the mobile station is displayed upon the text display 64.

Figure 5:
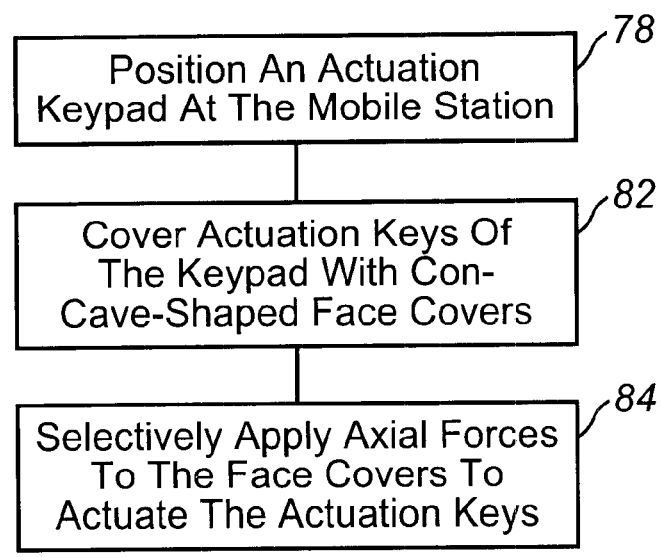
FIG. 5 illustrates a method flow diagram listing the method of operation of an embodiment of the present invention.

FIG. 5 illustrates the method, shown generally at 76, of an embodiment of the present invention. The method is operable to facilitate use of a mobile station by a physically-disabled user.

First, and as indicated by the block 78, an actuation keypad, formed of an array of actuation keys is positioned at the mobile station. The actuation keys of the actuation keypad are axially displaceable between an unactuated position and an actuated position. Then, and as indicated by the block 82, each actuation key of the actuation keypad is covered with a concave-shaped face cover. Each concave-shaped face cover seats upon a corresponding actuation key in which the concave-shaped face cover forms a force receiving surface to displace the actuation key associated therewith between the unactuated and the actuated positions, respectively. Then, and as indicated by the block 84, axial displacement forces are selectively applied upon selected ones of the concave-shaped face covers. Thereby, a physically-disabled person is able better to actuate the actuation keys through use of a mouth pin. face cover. Each concave-shaped face cover seats upon a corresponding actuation key in which the concave-shaped face cover forms a force receiving surface to displace the actuation key associated therewith between the unactuated and the actuated positions, respectively. Then, and as indicated by the block 84, axial displacement forces are selectively applied upon selected ones of the concave-shaped face covers. Thereby, a physically-disabled person is able better to actuate the actuation keys through use of a mouth pad.

The previous descriptions are of preferred examples for implementing the invention, and the scope of the invention should not necessarily be limited by this description. The scope of the present invention is defined by the following claims:

We claim:

1. In a mobile station having an actuation keypad formed of an array of actuation keys, each of the actuation keys of said actuation keypad axially displaceable between an unactuated position and an actuated position, said mobile station operable in a radio communication system, an improvement of a user interface of facilitating usage thereof by a physically-disabled user, said user interface comprising:
    a key mat comprising a plurality of concave-shaped face covers, at least one of said plurality of concave-shaped face covers corresponding with and disposed adjacent to an actuation key of said array of actuation keys said at least one concave-shaped face cover forming a force-receiving surface for facilitating reception of an actuation force from a mouth pin, thereby causing axial displacement of the adjacent actuation key out of the unactuated position and into the actuated position.

2. The user interface of claim 1 wherein the actuation keys of the actuation keypad have top face surfaces of first surface areas and wherein the force-receiving surfaces of said concave-shaped face covers are of second surface areas, the second surface areas greater than the first surface areas.

3. The user interface of claim 1 further comprising an annunciator coupled to receive indications of a mobile-station location request signal, the location request signal generated by a portable signal generator that is carriable by the user and external to the mobile station, said annunciator for generating an annunciation signal responsive to detection of the mobile-station location request signal.

4. The user interface of claim 3 wherein said annunciator comprises an audio transducer and wherein the annunciation signal comprises an audio signal generated in response to detection of a location request signal generated by the portable signal generator.

5. The user interface of claim 3 wherein said anunciator comprises a light transducer and wherein the anunciation signal comprises a light signal.

6. The user interface of claim 3 wherein said anunciator comprises a mechanical transducer and wherein the anunciation signal comprises a mechanical signal.

7. The user interface of claim 1 wherein the mobile station comprises transceiver circuitry for receiving forward link signals and for transmitting reverse link signals and wherein said user interface further comprises a TTY (Text Telephone) device coupled to the transceiver circuitry, said TTY device for converting indications of the downlink signals into text form and for receiving text inputs to be converted into the forward link signals.

8. The user interface of claim 7 wherein the mobile station comprises a mobile-station housing for housing the transceiver circuitry and wherein said TTY device is housed by the mobile-station housing together with the transceiver circuitry.

9. The user interface of claim 8 wherein said TTY device is coupled to the transceiver circuitry by way of a fixed connector and wherein the fixed connector is positioned within the mobile-station housing.

10. The user interface of claim 8 wherein the forward link signals are generated at a TRS (telecommunications relay service) and wherein the text inputs, received at said TTY device and converted into the reverse link signals, are transmitted to the TRS.

11. In a mobile station operable in a radio communication system, an improvement of a user interface for facilitating usage thereof by a physically-disabled user, said user interface comprising:
    an actuation keypad formed of an array of actuation keys, each of the actuation keys of said actuation keypad displaceable between an unactuated position and an actuated position;
    a plurality of concave-shaped face covers, said plurality of concave-shaped face covers at least corresponding in number with the actuation keys of which said actuation keypad is formed, each of said concave-shaped face covers disposed adjacent to an actuation key of said actuation keypad, each of said concave-shaped face covers forming a force receiving surface for facilitating reception of an actuation force from a mouth pin causing axial displacement of the actuation key upon which said face cover is seated out of the unactuated position and into the actuated position;
    a mobile-station location request signal generator housed separately from the mobile station and carriable by the user, said mobile-station location request generator actuable by the user to generate a location request signal for transmission to the mobile station; and
    an annunciator positioned together with the mobile station and coupled to receive indications of the mobile-station local request signal generated by said location request signal generator, said annunciator for generating an annunciation signal responsive to reception of the indications of the location request signal.

12. The user interface of claim 11 further comprising a mobile-station location request signal detector positioned together with the mobile station and coupled to said annunciator, said mobile-station location request signal detector for detecting transmission by said mobile-station location request signal generator of the location request signal and for providing the indications of the location request signal to said annunciator.

13. In a mobile communication system operable in a radio communication and having transceiver circuitry for receiving forward link signals and for transmitting reverse link signals, an improvement of a user interface for facilitating usage thereof by a physically-disabled user, said user interface comprising:
    an actuation keypad formed of an array of actuation keys, each of the actuation keys of said actuation keypad axially displaceable between an unactuated position and an actuated position;

a key mat comprising a plurality of concave-shaped face covers, said plurality of concave-shaped face covers at least corresponding in number with the actuation keys of which said actuation keypad is formed, each of said concave-shaped face covers seated upon an actuation key of said actuation keypad, each of said concave-shaped face covers forming a force receiving surface for facilitating reception of an actuation force from a mouth pin causing axial displacement of the actuation key upon which said face cover is seated out of the unactuated position and into the actuated position; and a TTY (Text Telephone) device coupled to the transceiver circuitry, said TTY device for converting indications of the downlink signals into text form and for receiving text inputs to be converted into the forward link signals.

14. The user interface of claim 13 wherein the mobile station comprises a housing for housing the transceiver circuitry and wherein said TTY device is housed together with the transceiver circuitry a housing for housing the transceiver circuitry and wherein said TTY device is housed together with the transceiver circuitry.

15. In a method for entering user inputs at a mobile station having an actuation keypad, formed of an array of actuation keys, at the mobile station, the actuation keys of the actuation keypad axially displaceable between an unactuated position and an actuated position, said mobile station operable in a radio communication system, an improvement of a method for facilitating use of the mobile station by a physically-disabled user, said method comprising:

covering the actuation keypad with a key mat comprising a plurality of concave-shaped face covers such that at least one of the concave-shaped face covers seats upon a corresponding actuation key, the at least one concave-shaped face cover forming a force-receiving surface for facilitating reception of an actuation force from a mouth pin to displace the actuation key associated therewith between the unactuated and actuated positions, respectively; and selectively applying axial displacement forces upon selected ones of the concave-shaped face covers.

16. The method of claim 15 wherein the mobile station comprises transceiver circuitry for receiving downlink signals transmitted thereto, said method comprising the additional operation of:

providing a TTY device in communication with the transceiver circuitry;

providing indications of the downlink signals to the TTY device; and displaying the indications of the downlink form in text form upon the TTY device.

* * * * *